United States Patent
Meersseman

(10) Patent No.: US 6,744,477 B2
(45) Date of Patent: Jun. 1, 2004

(54) UPDATING TRANSMITTER DATA STORED IN A PRESET CHANNEL MEMORY

(75) Inventor: Baudewijn M. S. C. Meersseman, Bruges (BE)

(73) Assignee: Koninklijke Philips Electronics N.V., Eindhoven (NL)

(*) Notice: Subject to any disclaimer, the term of this patent is extended or adjusted under 35 U.S.C. 154(b) by 437 days.

(21) Appl. No.: 09/817,098

(22) Filed: Mar. 26, 2001

(65) Prior Publication Data

US 2001/0030713 A1 Oct. 18, 2001

(30) Foreign Application Priority Data

Mar. 28, 2000 (EP) .............................................. 00201111

(51) Int. Cl.$^7$ .............................................. H04N 5/50
(52) U.S. Cl. ........................................ 348/731; 348/732
(58) Field of Search ............................... 348/554, 555, 348/731, 732, 733; H04N 5/50

(56) References Cited

U.S. PATENT DOCUMENTS

| | | | |
|---|---|---|---|
| 5,371,550 A | * 12/1994 | Shibutani et al. | 348/570 |
| 5,684,541 A | 11/1997 | Vaske | |
| 6,072,442 A | * 6/2000 | Stirling | 345/1.1 |
| 6,169,586 B1 | * 1/2001 | Riemann | 348/731 |
| 6,480,707 B1 | * 11/2002 | Hirose et al. | 455/179.1 |

FOREIGN PATENT DOCUMENTS

| | | | |
|---|---|---|---|
| EP | 0592975 | * | 4/1994 |
| EP | 0607810 | * | 7/1994 |
| EP | 0660603 | * | 6/1995 |
| EP | 0723367 A3 | | 7/1996 |
| EP | 0723367 A2 | | 7/1996 |
| EP | 0883245 A1 | | 12/1998 |
| GB | 22563333 A | | 12/1992 |
| WO | WO9929111 | | 6/1999 |

* cited by examiner

Primary Examiner—John Miller
Assistant Examiner—Brian Yenke

(57) ABSTRACT

A system for updating transmitter data stored in a preset channel memory, includes a processing unit, a tuner controlled by the processing unit, and a control unit for a user to control the processing unit. The processing unit is programmed to regularly run an automatic channel update algorithm for updating the channel memory by controlling the tuner to scan a video input signal for transmitter stations. The processing unit compares transmitter data of a transmitter station found with the transmitter data stored in the channel memory, wherein, in the case of a no match, the processing unit updates the channel memory either automatically or through a user interface program. In a television apparatus with such a system, the tuner used is the tuner of the television apparatus used in the stand-by mode of the television apparatus, or a second tuner if the television apparatus is provided with a second tuner, or the tuner of a video recorder connected to the television apparatus.

8 Claims, 2 Drawing Sheets

UPDATING TRANSMITTER DATA STORED IN A PRESET CHANNEL MEMORY

BACKGROUND OF THE INVENTION

1. Field of the Invention

The invention relates to a system for updating transmitter data stored in a preset channel memory, and to a television apparatus comprising such a system.

2. Description of the Related Art

The number of transmitter stations and the frequencies at which these stations can be received frequently change, causing nuisance to the users of, for example, television apparatus. International Patent Application No. WO 99/29111 discloses a system of the above-mentioned type, wherein a database is provided with updated transmitting specifications of individual television stations. The database information is forwarded to receivers in teletext pages on a specific television channel. The transmitting specifications received by a television apparatus are compared with the transmitter data in the preset channel memory when a user selects a channel. This known system is complicated and requires a dedicated database and television channel for transmitting the transmitter data of the television stations to the television apparatus.

Another prior art system of the above-mentioned type is disclosed in U.S. Pat. No. 5,684,541, wherein transmitter data is forwarded to a television apparatus via teletext for use in an automatic channel installation program. This patent states that the automatic channel installation program can be re-executed regularly. Updating the channel memory requires running the complete installation program.

SUMMARY OF THE INVENTION

It is an object of the invention to provide an improved system of the above-mentioned type, in which the channel memory can be updated in a user-friendly manner.

According to the invention, a system for updating transmitter data stored in a preset channel memory is provided, the system comprising a processing unit and a tuner controlled by the processing unit, and a control unit for a user to control the processing unit, characterized in that the processing unit is programmed to regularly run an automatic channel update algorithm for updating the channel memory by controlling the tuner to scan a video input signal for transmitter stations, wherein the processing unit compares transmitter data of a transmitter station found during scanning with the transmitter data stored in the channel memory, wherein, in the case of a no match, the processing unit updates the channel memory either automatically or through a user interface program.

In this manner, a system is obtained, wherein the channel memory can be updated in an easy manner without the requirement of a special database for updated channel information and dedicated teletext pages for forwarding transmitter data.

BRIEF DESCRIPTION OF THE DRAWINGS

The invention will be further explained with reference to the drawings, in which.

DESCRIPTION OF THE PREFERRED EMBODIMENTS

Figure 1:
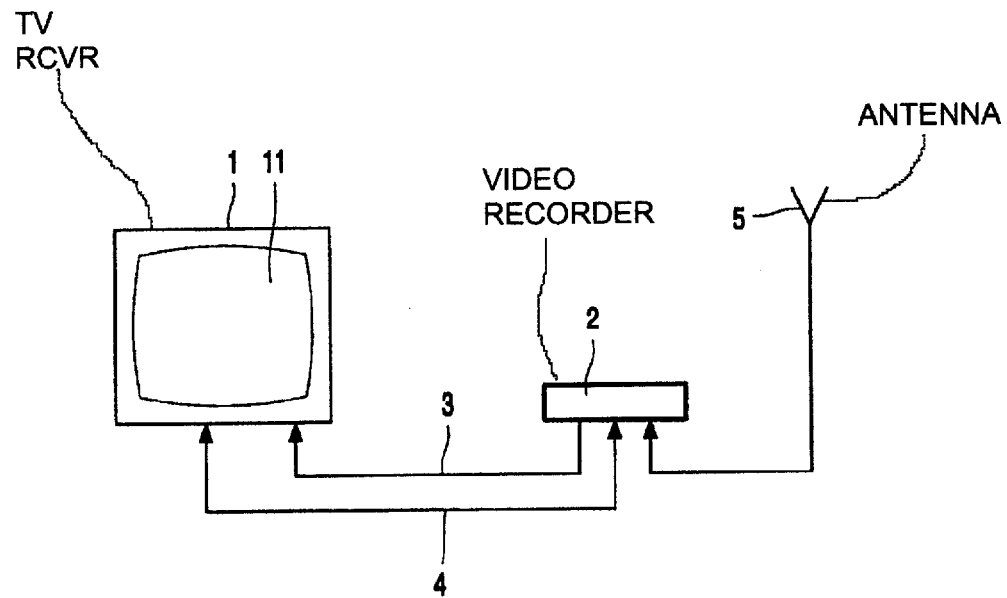
FIG. 1 shows a television receiver and video recorder, the television receiver being equipped with an embodiment of the system of the invention.

FIG. 1 shows a television receiver 1 and a video recorder 2 connected to the television receiver 1 by a cable 3 for antenna signals and a so-called SCART cable 4. An antenna 5 is connected to the video recorder 2 in a usual manner. It will be understood that, instead of an antenna 5, any other television/audio signal producing source, such as, a cable network, can be connected to the video recorder 2.

The television receiver 1 is provided with a system for updating transmitter data stored in a preset channel memory, in which a user of the television receiver can store the transmitter data of television stations the user wants as preset numbers 1, 2, . . . , n. Such transmitter data comprises, for example, frequency or channel number, station identification and station name. The transmitter data can be stored in the channel memory by means of an automatic channel installation program known per se. In such an automatic channel installation program, a user interface program can be used to communicate with the user and to allow the user to make selections. Generally, a user interface program communicates with the user by presenting a menu with options which can be selected by the user. As automatic channel installation programs and user interface programs are known and are not part of the present invention, no further details will be described.

Figure 2:
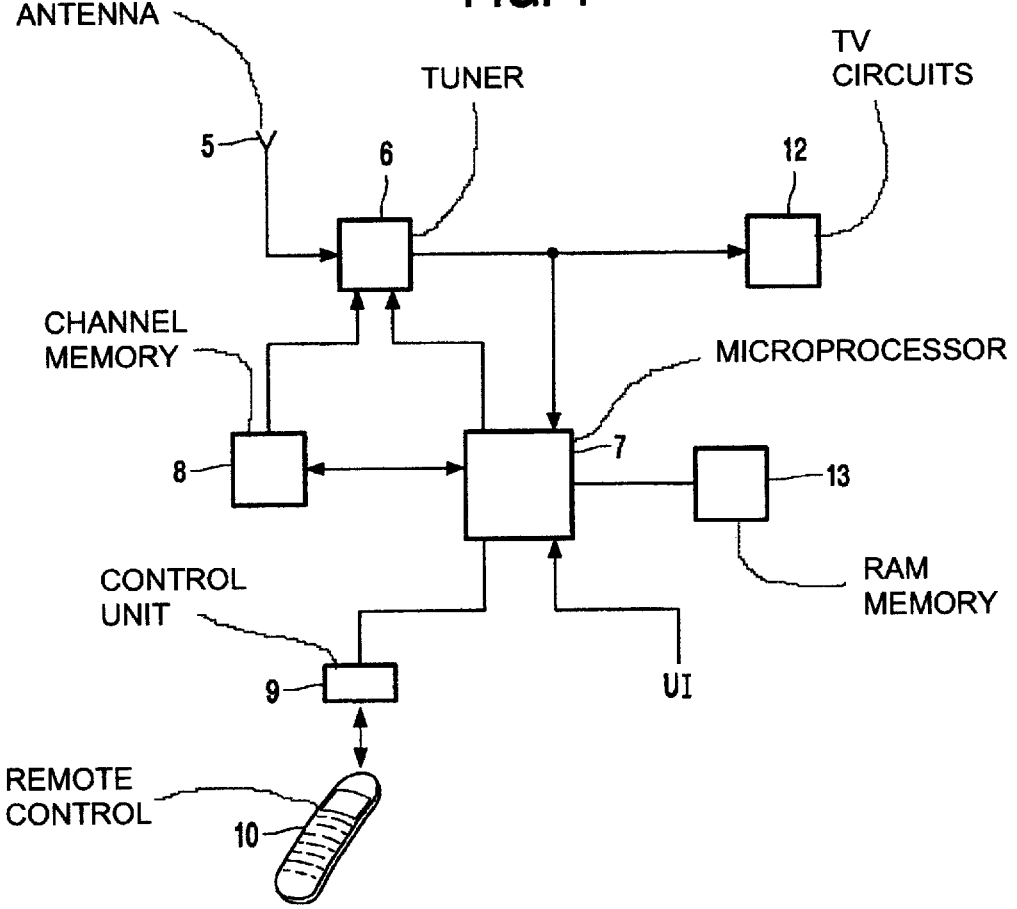
FIG. 2 shows a block diagram of the system used in FIG. 1.

The updating system is schematically shown in FIG. 2, and includes the antenna 5 connected to a tuner 6, and a microprocessor 7 for controlling the tuner 6. The preset channel memory is shown as block 8. In the embodiment shown, a control unit 9 comprises a remote control with which the user can provide instructions to the microprocessor 7, wherein a user interface UI is used for communication with the user by displaying selection menus on television screen 11. All other usual parts of the television receiver are represented in FIG. 2 by block 12.

Figure 3:
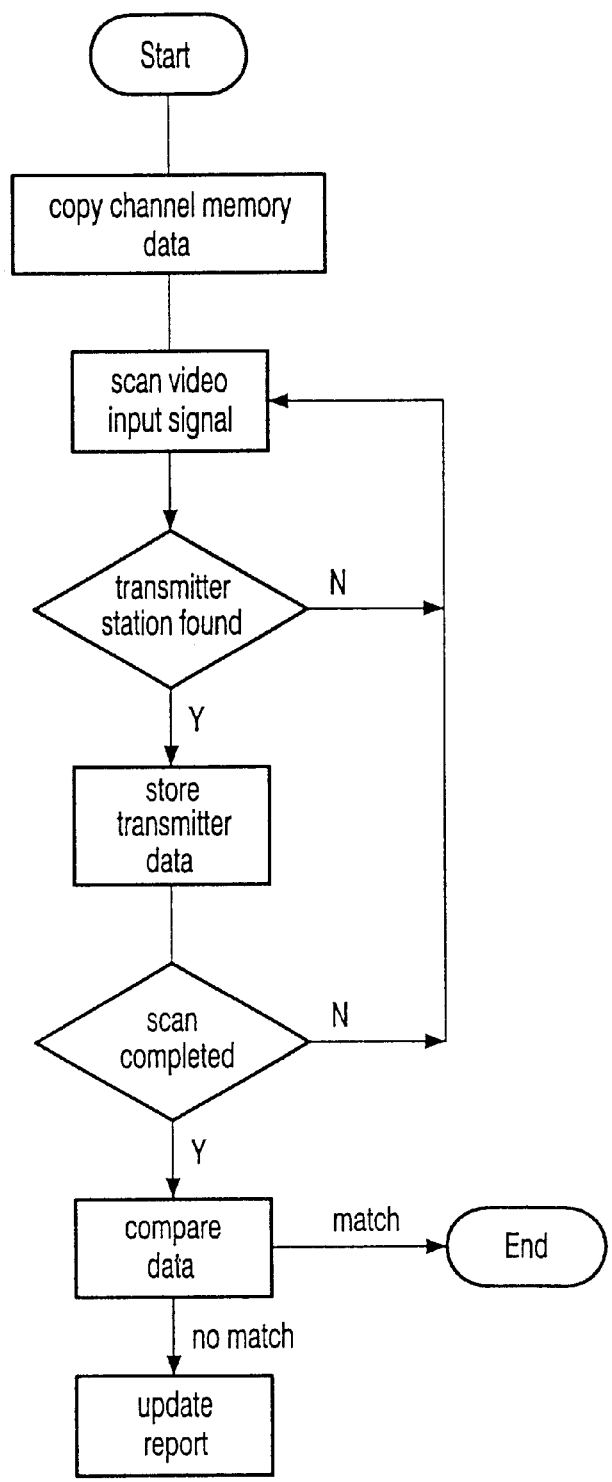
FIG. 3 shows a flowchart of the automatic channel update algorithm used in the system of FIG. 1.

In order to prevent nuisance due to changes of station frequencies, removals and/or additions of television stations, the microprocessor 7 is programmed to regularly run an automatic channel update algorithm for updating the channel memory 8. A flowchart of the algorithm is schematically shown, by way of example, in FIG. 3. The microprocessor 7 starts, for example, daily the updating algorithm and, according to this algorithm, tuner 6 is controlled to scan the video input signal received from the antenna 5. The microprocessor 7 monitors the output of the tuner 6 and if a transmitter station is found, the transmitter data of the transmitter station found is stored in a RAM memory 13. For each station found, the microprocessor 7 scans the station signal for a transmitter identification code and, if available, the station name. This data is added to the transmitter data and stored in memory 13. When the scan is completed, memory 13 contains a list of all stations available with the corresponding transmitter data, i.e., a transmitter data table. Thereafter, the microprocessor 7 compares the transmitter data obtained by scanning the video input signal with a copy of the transmitter data stored in channel memory 8. The copy of the transmitter data stored in channel memory 8 can either be made at the beginning of the algorithm or when the scan is completed. Of course, the preset numbers are copied together with the corresponding transmitter data.

If a no match is found for any transmitter station in the stored transmitter data obtained by scanning, the microprocessor 7 can update the channel memory 8 either automatically or through a user interface program with suitable menus.

If, for example, the frequency or channel number of a predetermined transmitter station is changed, the microprocessor 7 will find that at a certain preset number, a transmitter frequency is stored which is not present in the transmitter data table. Furthermore, the microprocessor 7 will find that the transmitter data table contains a new frequency which is not stored in the channel memory. If both the channel memory and the scanned transmitter data table contain a transmitter identification code, the microprocessor 7 can store the new frequency at the same preset number memory location. If preferred, the microprocessor 7 can first display a confirmation request through the user interface.

If a transmitter identification code is not available either in the preset number memory location or in the scanned transmitter data table, the microprocessor will communicate with the user through the user interface.

If two transmitter stations mutually change their frequency, this will be noticed by the microprocessor 7 when the scan is completed through the transmitter identification codes. The microprocessor 7 can suggest an automatic change of the frequencies stored through the user interface. If two transmitter stations mutually switch their frequencies and do not have a transmitter identification code, the microprocessor 7 will not suggest any change. However, both transmitter stations remain available in the channel memory for the user.

If new transmitter stations are found in the scanned transmitter data table, the microprocessor 7 can store the transmitter data of the newly found transmitter stations again either automatically or through the user interface. The microprocessor 7 can suggest preset numbers or a change within the order of existing preset numbers. If, in the alternative case, the copy of the channel memory contains transmitter data of one or more transmitter stations not found in the scanned transmitter data table, the microprocessor can suggest that the user should delete those preset numbers. Preferably, a suggestion of deleting a transmitter station from the channel memory 8 is only displayed if the microprocessor 7 establishes the absence of the station in two or more successive scans in order to prevent deleting a station due to a temporary station disturbance.

If the microprocessor 7 has completed a scan of the video input signal without finding any transmitter station, the algorithm is stopped, as obviously no video input signal is available.

If, for a predetermined number of transmitter stations the transmitter data stored in the channel memory appears to be not correct, i.e., if no match is found for these preset numbers, the microprocessor can stop the automatic channel update algorithm and display a suggestion through the user interface of starting an automatic channel installation. Such an automatic channel installation is known per se so that a further description of such a procedure is not necessary.

At the end of a channel update algorithm, an update status report will be produced for the user, by means of which the user can decide on the appropriate action to be taken, in particular if no automatic updates are made.

It is noted that the tuner 6 controlled by the microprocessor 7 for scanning the video input signal to carry out the automatic channel update algorithm may be the normal tuner of the television receiver 1 if the television receiver 1 is provided with one tuner only. In that case, the tuner 6 is used by the update algorithm in a semi-standby mode. If the television receiver 1 is provided with a second tuner, the second tuner can be used for the update algorithm if the second tuner is not being used by the user. As a third possibility, the microprocessor 7 could use the tuner of the video recorder 2, if a so-called easy-link connection is available between the television receiver 1 and the video recorder 2.

In the embodiment of the system described, the update algorithm can also be started at a command given by the user.

It will be clear from the above that the invention provides a system for updating transmitter data stored in a preset channel memory, the system comprising a processing unit, a tuner controlled by the processing unit, and a control unit for a user to control the processing unit. The processing unit is programmed to regularly run an automatic channel update algorithm for updating the channel memory by controlling the tuner to scan a video input signal for transmitter stations. The processing unit compares transmitter data of a transmitter station found with the transmitter data stored in the channel memory, wherein, in the case of a no match, the processing unit updates the channel memory either automatically or through a user interface program. In a television apparatus with such a system, the tuner used is the tuner of the television apparatus used in the stand-by mode of the television apparatus, or a second tuner if the television apparatus is provided with a second tuner, or the tuner of a video recorder connected to the television apparatus. The system described provides a convenient facility for the user preventing cumbersome changes in the transmitter stations preset in the channel memory. Nuisance is prevented in an effective manner. Although the system is described as used in a television receiver, the system may also be used in other receiving equipment, such as, a video recorder or audio receiver.

The invention is not limited to the above described embodiments which may be varied in a number of ways within the scope of the appendent claims.

What is claimed is:

1. A system for updating transmitter data stored in a preset channel memory, the system comprising a processing unit and a tuner controlled by the processing unit, and a control unit for a user to control the processing unit, characterized in that the processing unit is programmed to regularly run an automatic channel update algorithm for updating the channel memory by controlling the tuner to scan a video input signal for transmitter stations, wherein the processing unit compares transmitter data of a transmitter station found with the transmitter data stored in the channel memory, wherein, in the case of a no match, the processing unit updates the channel memory either automatically or through a user interface program, and wherein, in the automatic channel update algorithm, the processing unit copies the transmitter data stored in the channel memory in a temporary memory, stores the transmitter data of all transmitter stations found in the temporary memory and compares the transmitter data of the transmitter stations found with the copied transmitter data, updates the copied data either automatically or through a user interface program, and writes the updated transmitter data in the channel memory.

2. The system as claimed in claim 1, wherein the processing unit is programmed to scan the signal of a transmitter station found for a transmitter identification code, the transmitter identification code found is added to the transmitter data to be stored, the processing unit compares the transmitter identification code with the transmitter identification codes stored in the channel memory, and wherein, in the case of a match with a transmitter identification code stored at a given memory location of the channel memory, the processing unit stores the corresponding new transmitter data at this location either automatically or through a user interface program.

3. The system as claimed in claim 1 or 2, wherein the processing unit is programmed to store the transmitter data of a transmitter station, of which no corresponding data is stored in the channel memory, at an empty memory location of the channel memory either automatically or through a user interface program.

4. The system as claimed in claim 1 or 2, wherein the processing unit is programmed to remove transmitter data from the channel memory if no corresponding transmitter data is found during scanning of the video input signal.

5. The system as claimed in claim 4, wherein the processing unit is programmed to remove the transmitter data only after at least one subsequent scanning cycle during which no corresponding transmitter data is found, either automatically or through a user interface program.

6. The system as claimed in claim 1 or 2, wherein the processing unit is programmed to suggest an automatic channel installation to the user if the number of no matches found during scanning the video input signal exceeds a predetermined number.

7. The system as claimed in claim 1 or 2, wherein, the processing unit is programmed to start controlling the tuner to scan a video input signal for transmitter stations at a user request through the control unit.

8. The system as claimed in claim 1 or 2, wherein, in the case of a no match, the processing unit generates an update status report to inform the user.

* * * * *